Figure 1:
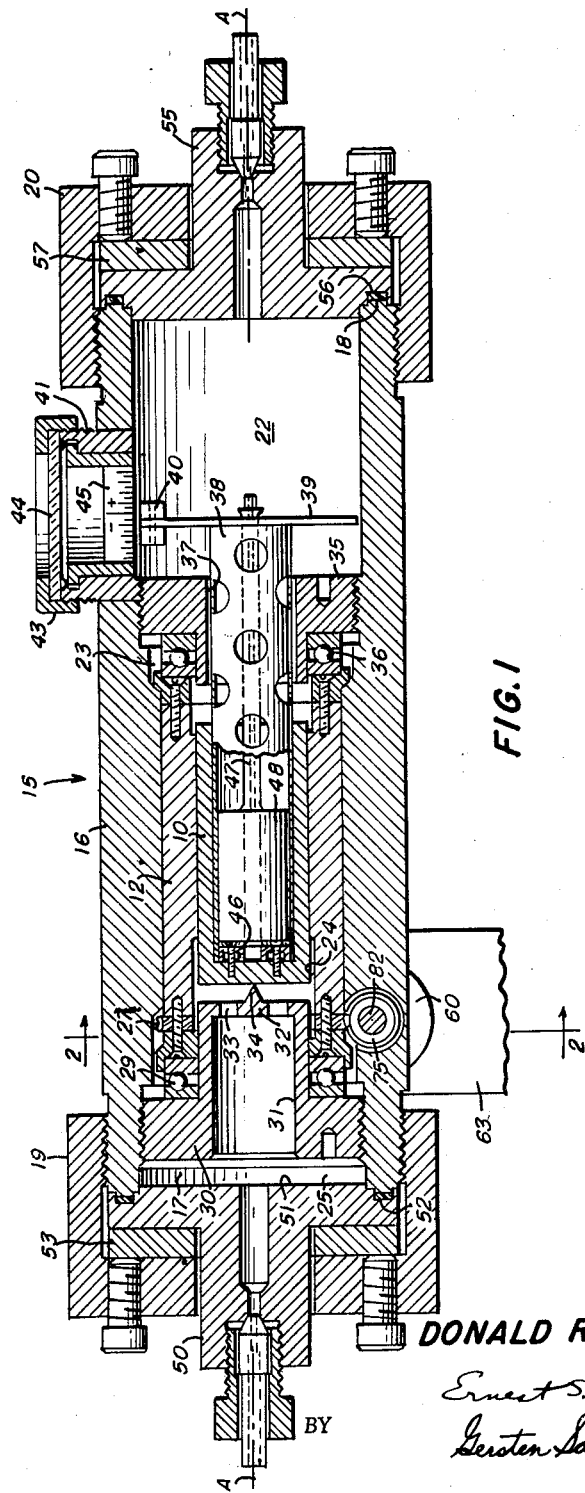

July 20, 1965  D. R. DOUSLIN  3,195,354
INCLINED-PISTON DEAD-WEIGHT PRESSURE GAUGE
Filed Feb. 28, 1963  3 Sheets-Sheet 1

INVENTOR
DONALD R. DOUSLIN
BY Ernest S. Cohen
Gersten Sadowsky
ATTORNEYS

INVENTOR
DONALD R. DOUSLIN
BY
ATTORNEYS

INVENTOR
DONALD R. DOUSLIN

{ # United States Patent Office 3,195,354
Patented July 20, 1965

3,195,354
INCLINED-PISTON DEAD-WEIGHT PRESSURE GAUGE
Donald R. Douslin, Bartlesville, Okla., assignor to the United States of America as represented by the Secretary of the Interior
Filed Feb. 28, 1963, Ser. No. 261,913
1 Claim. (Cl. 73—419)
(Granted under Title 35, U.S. Code (1952), sec. 266)

The invention herein described and claimed may be manufactured and used by or for the Government of the United States of America for governmental purposes without the payment of royalties thereon or therefor.

This invention relates to a dead weight pressure gauging apparatus having controls for producing a zero pressure differential, or a null effect upon a tiltable piston operably supported to move freely in the apparatus. More particularly, the invention concerns improvements in a sensitive pressure gauge in which a component force created by the dead weight of a piston structure brought to an angular displacement from the horizontal, is applied to counterbalance a force on the piston exerted by the pressure of a substance under test. This improved pressure gauge may be adapted to provide very accurate vapor pressure data, and can be employed to very good advantage for measuring the vapor pressure of substances whose volatility range is such that it becomes impractical to use ordinary ebulliometric or static vapor pressure apparatus. Accurate vapor pressure data on volatile substances such as hydrocarbon, sulfur and nitrogen compounds is obtained without difficulty by means of the gauge according to the present invention. Measurements in the pressure range from 0.01 to 40 mm. Hg are attainable even though small samples of such substances are used. The gauge is also applicable to provide precise data on gas pressures other than vapor pressures.

Since the accuracy of the gauge is dependent upon establishing within close limits the magnitudes of the forces acting on a piston, the present invention comprises means to substantially eliminate the relatively significant indeterminate forces of friction to which the piston might be subject. Provided for the purpose is a unique bi-directional drive which is transmitted to the piston for imparting thereto an oscillatory motion without producing any susceptible end thrust to act axially upon the piston.

An object of the present invention therefore is to provide a dead-weight pressure gauge comprising an angularly adjustable arrangement in which a weighted element is displaced to counterbalance the force of the pressure applied to be gauged.

A further object of the present invention is to provide a a precisely accurate pressure gauge apparatus comprising an arrangement of cylindrical elements including a piston driven for rotational and directional displacements therein, on which frictional forces of the rotation are effectively eliminated, and other forces are adjusted to a counterbalance effectuating a null condition in the piston drive for a directional displacement.

Figure 2:
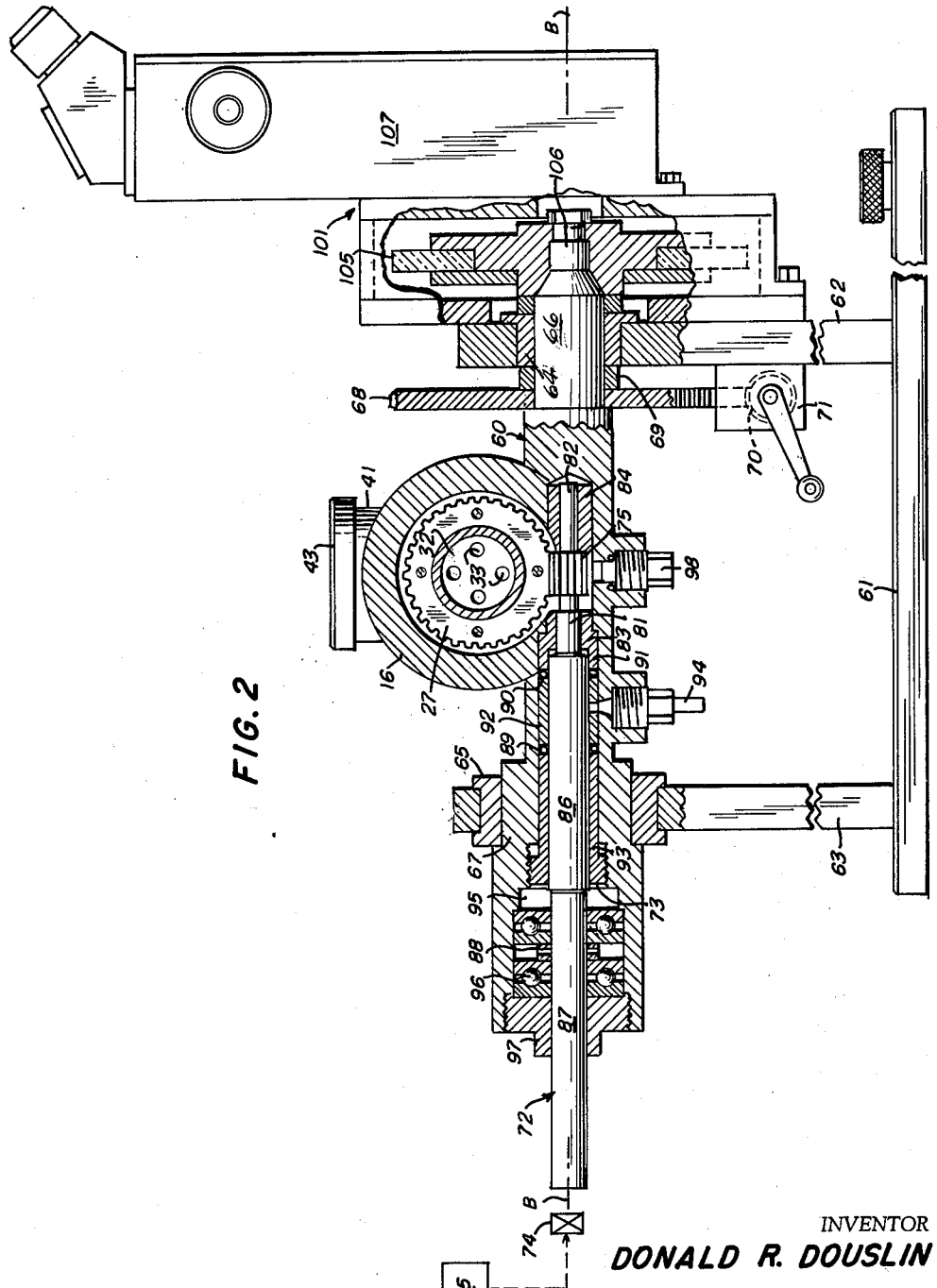
Figure 3:
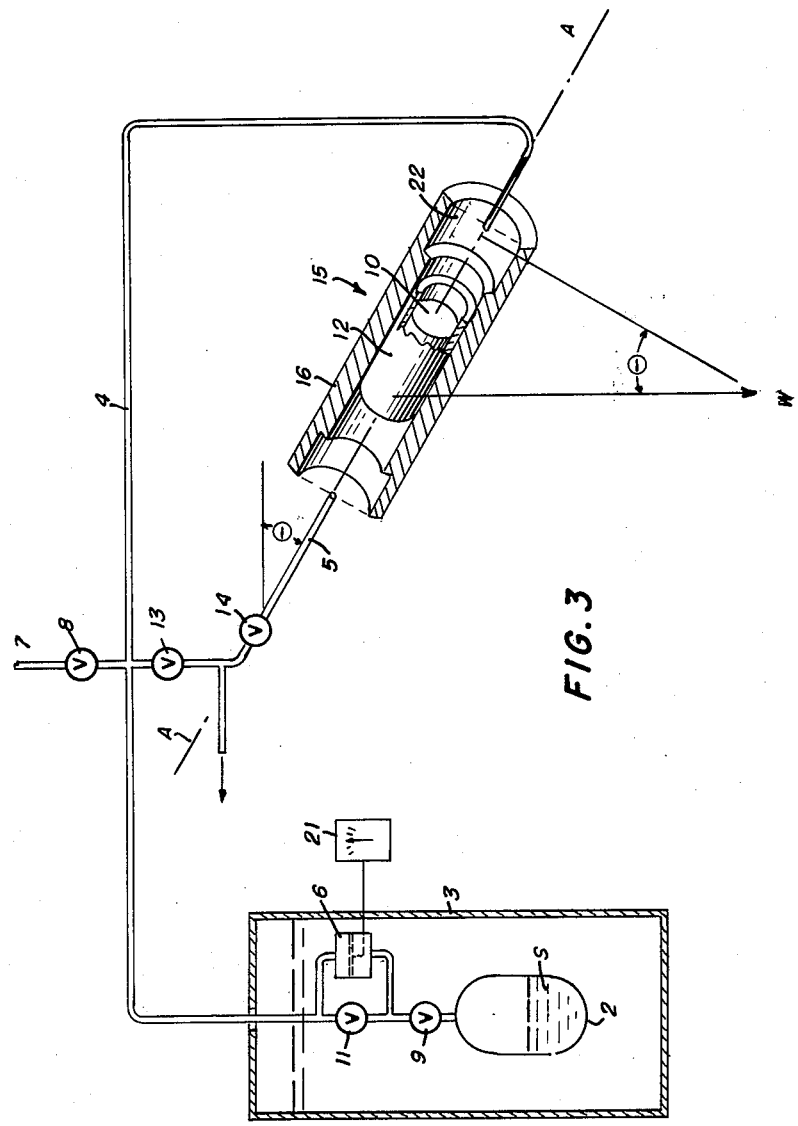

These and other objects and advantages of the invention will be more clearly understood from the following description of a preferred embodiment of the invention, considered together with the accompanying drawing wherein:

FIG. 1 is a sectional view through a main housing of the invention, showing in detail the elements of the piston-cylinder structure made operable therein;

FIG. 2 is a sectional view taken partly on line 2—2 of FIG. 1, and showing the details of a rotatable auxiliary housing and its support, to which the housing of FIG. 1 is joined and made operable thereby for tilting in a vertical plane; and FIG. 3 is a schematic diagram illustrating various parts of the invention including the piston-cylinder structure of the gauge, as these parts are arranged when applied in a pressure measuring operation.

A pressure sensing and indicating apparatus according to the present invention, is shown in FIGS. 1 and 2, to comprise at its core, a hollow cylindrical piston 10 supported for displacement within a piston housing cylinder 12. This combination of parts is in turn supported for displacement within a tubular housing or enclosure 15. Comprising the tubular enclosure are an elongated cylindrical sleeve 16, having externally threaded portions adjacent each of its open ends 17 and 18. Closure caps 19 and 20 having screw threads suitably arranged therein, fasten over the open ends 17 and 18, respectively of the sleeve 16, whereon the caps are positionable to bring together the structural elements assembled within the tubular enclosure 15, in a manner to be hereinafter more fully explained.

Arranged from right to left between the closure caps of the housing 15, along the longitudinal axis A—A thereof as viewed in FIG. 1, are a series of contiguous interspaces, or chamber-like sections 22, 23, 24 and 25, in which are located the several operatively related integrated parts of the structure arranged within the cylindrical sleeve 16. Enclosed within the relatively long intermediate space 24 of the sleeve, is the structure comprising piston 10 and cylinder 12, constituting the principal operative component of the apparatus. Within the slightly wide cylindrical space 25 of the sleeve is enclosed a ring-like worm gear 27, and a thrust ball bearing element 29. One race of the bearing element is brought to bear upon the narrow web of gear 27, which itself is attached to the surface defining one end rim of the cylinder 12, by long screws or the like, whereby a wide opening in the gear conforms to the opening in the end of the cylinder. In this manner cylinder 12 is fixed to rotate with the gear 27 when the gear is driven by a worm 75 made operative by means to be hereinafter more fully described. An internally threaded portion of sleeve 16 located within section 25, receives in engagement therewith a bearing retainer member 30. Composing this member is a thick flange from which projects a central conduit 31. On a shoulder formed by the cylindrical surface of conduit 31, and the flange, is situated the matching race comprising ball bearing 29. Formed as an integral part of the conduit 31 to cover over its extended end, is an apertured wall 32 comprising a number of small openings 33. A pointed projection 34 at the center of the wall 32, is adapted to stop piston 10 at one limit of its longitudinal displacement in the cylinder 12.

Arranged in a substantially similar manner in section 23 of the sleeve, are elements analogous to those in section 25. Included is a thrust ball bearing 36, having parts including one race, fastened to the rim surface at the other end of cylinder 12, and parts including the matching race, maintained on a shoulder formed on a second bearing retainer member 35. Like its counterpart in section 25, the retainer member 35 comprises a relatively thick flange having threads thereon and a conduit portion 37. However, conduit 37 is fully open at both ends, and receives therethrough an elongated tubular element 38 in whose surface a substantial number of evenly spaced holes have been made, to lighten it. The greater part of tubular element 38 is tightly fitted within the cavity formed by the shell of piston 10, whereby the element is positioned to extend out into the relatively wide section 22, of sleeve 16. In the open end of the tubular element 38 located within the piston 10, is secured a disk-like plug 46, to whose center is fastened a slim shaft 47, passing axially through the element and extending slightly outside the opposite end opening thereof. Shaft 47 is adapted to be received through an axial passage in a weight 48 made of iridium or gold, whereon the weight is retained in contact with the plug 46 by means of an elongated flared expansion sleeve or other suitable fastening fitted to the shaft 47. A thin disk 39 having a central opening, is concentrically arranged and fastened on the rim defining the opening at the opposite or extended end of tubular element 38. At the outer periphery of disk 39, which closely conforms to the internal diameter of section 22, there is attached by screw or the like, a small weight 40, formed as a peripheral segment on the disk.

A short circular flange 41 protruding from the outer cylindrical surface of sleeve 16, forms a relatively wide opening through which may be seen the various parts arranged within section 22. Across the inside end of opening 42 is located a scale or index 45. The thin edge of disk 39 is movable along this index to indicate through opening 42 the relative longitudinal position of the piston 10. Threads on the lip of flange 41, receive a cap 43, the head of which comprises a sight glass 44 allowing the view of the disk and scale through opening 42, while maintaining a sealed atmosphere in the chamber of sleeve section 22.

Elements of substantially identical form arranged within the respective closure caps 19 and 20, facilitate a path for gaseous flow out of and into the housing 15. Associated with cap 19 for example is a relatively short conduit 50, provided with screw threads inside one end adapted to have joined thereto a conventional pipe nipple for coupling gas flow conduits to the apparatus. An end face 51 of a flanged portion at the other end of the conduit, is slightly reduced to define a depressed peripheral surface. A narrow track formed in such peripheral surface secures a gasket 52 made of Teflon or the like, in position to effect a sealing contact upon the surface of a raised ring following the rim of an opening 17 in the sleeve 16, when the end surface 51 is received as a plug within the sleeve. Between the inner surface of cap 19 and the flange portion of the conduit 50, is a packing ring 53 maintaining the conduit and plug firmly in sealing contact when the cap 19 is drawn up on the exterior screw threads provided at the ends of the housing sleeve. The corresponding association of elements found between opening 18 of the housing sleeve and the cap 20, include a conduit and plug 55 having a gasket 56, and a packing ring 57 which like the ring 53, aids in obtaining positive closure on the plug gasket when the gauge is assembled. The portions of the conduit plugs 50 and 55 extending outside of the housing 15 are received through appropriately sized central openings in the respective closure caps.

Supporting housing 15 for operational manipulation is an arrangement of structure best shown in FIG. 2, which enables a precise limited rotative displacement of the housing about an axis transverse thereto, and multiple rotations of the piston and cylinder combination within the housing about the longitudinal axis thereof. A fundamental component of the support structure is a further housing 60 whose outer form is an integral surface defined by a series of cylindrical portions of gradually diminishing diameters. Cooperatively related within and without the cylindrical portion of the housing are the various elemental parts constituting the drives for causing the aforementioned rotational displacements. Housing 60 is maintained in an operative position in a stanchion comprising a leveling base 61, from which rise uprights 62 and 63. At a suitable height above the base, the uprights 62 and 63 have aligned openings in which are secured flanged bearing sleeves 64 and 65, respectively. Cylindrical portions 66 and 67, at spaced intervals along the housing 60, are received in the respective bearing sleeves 64 and 65. A worm gear 68 is fixed to the housing 60 at one end of cylindrical portion 66, in contact with a spacer element 69 bearing on a rim of bearing sleeve 64. Maintaining a worm 70 in operative relationship with worm gear 68, are a number of support bearings mounted in brackets such as element 71, which are fastened at suitably spaced locations on the upright 62. Worm 70 can be made operative to drive the gear 68, by hand activated means or any power controlled gear drive arrangement.

To properly locate the worm gear 27 of housing 15, for an operative connection with the worm 75 located within an intermediate portion of the housing 60, segments of the respective housing bodies are merged at right angles to each other, to form by a weld or braze at their junction, the integral structure best illustrated in FIG. 2. More particularly, cylindrical sleeve 16 is received within an opening in a cylindrical surface between the bearing portions 66 and 67 on the housing 60. Supported for rotation within an extended, generally cylindrical cavity defined by the inner surface of housing 60, is an integral shaft structure 72, comprising portions of varying lengths and different diameters. Situated on this shaft structure between bearing sleeves 83 and 84, fitted upon reduced diameter end portions 81 and 82 of the structure, is the worm 75, in proper position to operatively engage the gear 27 attached to the cylinder 12. An input drive to the worm is received from a motor means 85 flexibly coupled by a conventional means 74, to a large diameter end portion 87 of the shaft structure and transmitted to the worm through an extended intermediate shaft portion 86.

Since the driven shaft structure 72 enters a potential high vacuum area of the apparatus, two rotary O-ring seals 89 and 90 made of rubber, are applied around the shaft portion 86 in the housing cavity 88. A series of adjustable compression sleeves 91, 92 and 93, securely fitted around the intermediate shaft portion 86, function to maintain the O-rings in their proper place along the shaft, and in cooperation with an intermediate vacuum port 94, provide a vacuum tight seal between the atmosphere and the piston head end of the housing 15. A threaded connection between an enlarged end 73 on the sleeve 93, and a threaded area within housing cavity 88, permits this sleeve to be adjusted relative to the housing and the shaft portion 86. By such means it becomes possible to conveniently apply pressure to the O-rings between the several sleeves on the shaft portion 86, since the end sleeve 91 is held from any displacement by its contact with fixed bearing sleeve 83. A slight over-compressed condition for the O-rings is needed initially in order to have a proper contact between the O-rings and the metal surface of the shaft therein, to obtain a vacuum seal. This follows from the fact that the rubber of the O-rings shrinks when subjected to the frictional heat developed in them by the shaft structure rotating in such rings. Therefore, the objective of adjusting sleeve 93 is to precompress the O-rings just enough so subsequent shrinkage will leave the rubber to metal contact vacuum tight but not so tight as to cause heating beyond an amount that would destroy the O-rings. Member 87 of the drive shaft is supported in a set of bearings 96 set into a cylindrical chamber 95 at the relatively large outer end of the housing cavity 88. The drive shaft extends beyond the vacuum seal and outside the housing 60, through a central opening in a threaded flange-like bushing element 97, which screws into the end rim of the housing to provide a retaining member for the bearing elements 96. A conventional threaded plug 98 received within an opening in the housing wall immediately beneath the worm 75, provides access thereto for lubrication as required.

Accurate measurement of the angle to which the assembled apparatus is inclined from the horizontal by means of gear members 68 and 70, is accomplished by using a goniometer 101, set up along side of one end of the apparatus. As best seen in FIG. 2, the goniometer cooperates with a circular glass plate 105 axially mounted on a stub end 106 of the housing 60, and rotatable therewith about the axis B—B. Inscription on the plate comprising gradiations of 10 minutes of arc, are viewed through a stationary optical coincidence reading system 107 of the goniometer, wherein a reading microscope and vernier can be read directly to one second. This optical measuring instrument may have the form of one commercially available as the "Unisec," from W. & L. E. Gurley of Troy, New Jersey. Because plate 105 is fastened to stub 106 at an arbitrary setting, and the position of the axis A—A through piston 10, with respect to the base plate 61 cannot be determined independently, the goniometer reading that corresponds to the true horizontal position of the piston is determined by bringing the piston into balance when there is no pressure drop across it. As will be made more evident hereinafter, piston balance is indicated when the thin edge of disk 39 is indexed about the mid-point of scale 45.

Although the goniometer can be read very precisely, the accuracy with which the equilibrium angle of inclination can be measured depends ultimately on the amount of friction produced on the relatively displaceable surfaces subject to contact between the sleeve 16 and the cylinder 12, and the latter and piston 10. Frictional effects that were not entirely removed by precision honing of the piston and cylinder, are reducible to a negligible amount by an oscillatory movement imparted to the piston. Moreover, a relatively non-volatile vacuum pump oil is applied to lubricate the critical piston, cylinder and sleeve surfaces whereby a lubrication seal is produced and remains effective at very low pressures such that the pumping effect ordinarily observed on air lubricated piston-cylinder combinations, is eliminated. Lubricating with vacuum pump oil also allows the pressure measurements to be referred to a vacuum instead of an atmospheric datum level. As a result it is possible to use the present invention for measuring pressures as low as 0.01 mm. Hg.

The present invention functions to bring about the aforementioned friction defeating oscillatory movements without the use of any direct mechanical contact upon the piston. As a result, the equilibrium of the piston is not disturbed, or displaced with respect to the pressure being measured. Basically, the input for effecting the movements in this manner is a rotational drive transmitted to the piston 10 from the conventional adjustable speed motor 85 as shown in FIG. 2. As previously indicated, suitable connections from the motor to the shaft structure 72, causes the worm 75 fixed thereto, to rotate gear 27 and the cylinder 12 to which the gear is attached. Rotation of the cylinder at nearly constant speed in one direction in turn induces a unidirectional, rotational drive to the piston 10 due to the drag in the lubricating oil between the connecting surfaces of these parts. Disk 39 rotating with the piston 10, consequently lowers and raises the weight 40 eccentrically mounted on the disk, and as a result the continuing variable forces engendered thereby are imposed on the rotational drive, causing acceleration followed by de-acceleration in the rotation of the piston and the parts attached thereto. In this manner all critical frictional effects are substantially eliminated, and without producing thereby any net force along the axis of the piston. The oscillatory motion of the piston also eliminates the screw effect which would ordinarily occur when one part of the piston-cylinder combination is rotated continuously in one direction. As hereinabove explained, a highly efficient vacuum seal about the drive shaft structure 72, is provided by the O-rings 89 and 90, in cooperation with sleeves 91, 92 and 93, to prevent pressure leakage into housing 15 during operation of the apparatus as described.

Utilization of the present invention for precision pressure measurements requires that the longitudinal axis B—B through the housing 60, be carefully leveled to define a parallel reasonably close to the horizontal. Any significant deviation of this axis from the horizontal would interfere with any attempt to measure directly the angle to which housing 15 is inclined to position the weight of piston 10 for counterbalancing the gas pressures. One methed for accomplishing a proper leveling of the axis B—B of the housing 60, employs a telescope attached along the top of housing enclosure 15, and a plumb line at which the telescope is sighted. The deviation angle can be reduced to a few minutes of arc by merely adjusting the level of the base plate 61 until the cross-lines on the telescope show no departure from alignment with the plumbline when the housing is moved from the horizontal to a fully inclined position. When housing 15 is angularly adjusted about an accurately leveled axis to control its degree of inclination from the horizontal, the effective weight to area ratio of its piston may be precisely modified to assume any selected value within a predetermined range, including zero when the housing is adjusted to a horizontal alignment.

To obtain in accordance with the present invention, a measurement of the vapor pressure of a sample S shown in FIG. 3 as contained in ampoule 2 suspended in a thermostat 3, requires that the vapors produced in the ampoule be directed into a system of pipes and valves in the nature of that shown schematically in the figure. If the vapors of the sample are inert to the gauge parts, and the temperature of the sample is below that of the gauge and connecting lines, a valve 11 is opened and valve 8 in a line 7, and a valve 9 on the ampoule, are closed while a line 4 and the chambers 22 and 25 of the housing 15, are evacuated through a line 5 and valves 13 and 14, to a high vacuum up to $10^{-5}$ mm. Hg. Gauging is begun by closing valve 13, with valve 14 remaining open, so that a null reading can be taken on the goniometer with the piston in the horizontal position. Upon completion of the null reading, with valve 13 closed, the valve 9 is opened, allowing sample vapors to fill line 4 and chamber 22. The housing 15 is then tilted about the axis B—B shown in FIG. 2, by means of gears 68 and 70, such that the pressure forces built-up by the vapors in chamber 22 become effective and tend to displace piston 10 against the counter force of the piston's component weight in the axial direction, since atmospheric pressure has been removed at the head end thereof. Tilting of housing 15 about the axis B—B is continued to incline the housing 15 from a horizontal attitude toward the angle θ, until indicator elements 39, 45, viewed in sight opening 44, show the reciprocating motion of the piston parallel to its longitudinal axis A—A is minimized at a minute degree of tilting. Upon arriving at this pressure equilibration between the piston and sample vapors, a final reading is taken on the goniometer. Valves 11 and 14 remain open at all times during the pressure reading.

An alternative operation for the system is necessary if the sample vapors are corrosive or the sample is at a temperature greater than the temperature of any part of the gauge or line between the ampoule 2 and the piston structure. In that case the sample S is isolated in the thermostat 3 by a sensitive, inert diaphragm of a pressure transducer 6, and nitrogen or some other suitable gas supplied through the pipe line 7, is used to transmit the pressure from the diaphragm to the piston chamber. To start, the operation is as previously described, with an evacuation of the gauge and lines, followed by the null reading on the goniometer as was prescribed for the inert sample. However, in addition a null reading is obtained on the pressure transducer 6. Following the two null readings, valves 13 and 11 are closed, and valve 9 is opened to allow nitrogen to bleed in (or out) through valve 8 to return the transducer to the null point. Motion of the transducer diaphragm may be conveniently indicated on a capacitor meter 21. Since the diaphragm is directly subject to the vapor pressure in the ampoule 2, as well as the piston's counterbalancing force transmitted through the nitrogen in the lines, it functions to control indicator 21 in the same way as are the indicator elements 39 and 45 of the housing 15. The absolute value of the pressure of the nitrogen and therefore of the sample, can then be read on the piston gauge by a procedure wherein the smallest angular increment in the over-all inclination of the housing and its piston is found which will cause a reversal in the direction of axial travel of the piston, and movement of the diaphragm back and forth an equal amount on each side of its null point. Since this pressure gauging requires an axial movement of the piston, and consequently a change in the volume of the chamber 22 during gauging, the volume of nitrogen must be adjusted initially to a value that will place the piston about midway in its axial travel when the transducer 6 is at a null indication. During the pressure reading in this instance, valves 9 and 14 remain open, whereas valves 11 and 13 remain closed.

Thermostat 3 may be made according to any conventional construction for such an apparatus, although for the purposes of the present invention a temperature control in the neighborhood of 0.001 to 0.002° C. is needed. One suitable form of thermostat comprises an insulated cylindrical vessel, filled with liquid and provided with a stirrer, an electrical heater with manual adjustment, a smaller electrical heater having a precise controller, and a cooling coil through which refrigerant can be flowed under temperature and rate control. Also within this thermostat is a temperature sensitive element comprising part of the temperature controller, and a temperature measuring device such as a platinum resistance thermometer.

A basis for a theoretical relationship from which an absolute value of the vapor pressure $p_{mm}$, for the sample S, can be calculated, is found in a consideration of the opposing forces made to act on the piston 10 in carrying out the aforementioned procedures. A balance is achieved such that the component of the piston's weight along axis A—A is equal to the pressure force of the vapor upon the piston structure, and may be stated as $$p_{mm} = \frac{g(W \sin \Theta)}{g_{std} (A)}$$

which relates the piston's angle of inclination from the horizontal $\Theta$, its effective area A and weight W, and the on site and standard accelerations of gravity $g$ and $g_{std}$.

The effective weight of the piston structure includes the weight of the cylindrical piston 10, the disk 39, and its supporting tube 38, the eccentrically mounted weight 40, and a small amount of lubricating oil. As required, additional weight such as element 48, may be placed inside the hollow structure of piston 10 to increase the pressure range. For example, when gold is used as a weight the piston weight can be approximately doubled. The amount of oil that contributes to the weight of the piston can be assumed to be that which remained on the surface of a properly lubricated piston as it was withdrawn from the cylinder. The effective area of the piston must also include a portion of the lubricating oil film. However, the thickness of the film becomes less important as the diameter of the piston increases. For a one-inch piston the arithmetical average diameter of the external diameter of the piston 10 and the internal diameter of the cylinder 12 can be used unless an accuracy greater than 1 part in 10,000 is demanded.

Estimating the precision of the gauge proper is easily accomplished since the piston area and the weight are maintained constant, and the only variable to be considered is therefore the angle of inclination $\Theta$. However, in any overall estimation of the precision and accuracy of a pressure measurement made by means of the present invention, consideration must also be given to the operational characteristics of the various ancillary elements constituting the gauge arrangement. The nature and purity of the sample, and the precision of the temperature control in the sample thermostat 3, will each effect the inherent precision of a vapor pressure measurement. Even though the vernier of the goniometer can be read to 1 second, the smallest practical increment in the inclination of the housing and piston that will reverse the direction of its axial travel to find the minimum reciprocating displacement, is about 5 seconds. Nevertheless, in terms of pressure, this increment is less than .0007 mm. Hg, on the average, whereby the resulting precision achieved is better than one micron.

Because of the extremely precise measurements that can be made by means of the present invention, it is applicable for determining vapor pressures below room temperature for high boiling or unstable organic substances that could not be studied by other known methods, as well as for detonable or rare substances which require that their use be limited to very small samples. From the data derived using the present invention, accurate values of heat and entropy of vaporization and entropy of compression can be calculated.

While a preferred embodiment of the invention has been illustrated and described herein, it is to be understood that the invention is not limited thereby, but is susceptible to changes in form and detail.

What is claimed is:

A precision gauge for measuring the pressure of gas stored within an enclosed container, comprising a tiltable housing including a cylinder having a piston means displaceable therein, and an enclosed chamber at either end of the piston means, indicator apparatus including an enclosure having first and second portions separated by a diaphragm, and indicia means controlled by the displacement of the diaphragm from a centered position between the said enclosure portions, conduits joining the enclosed container to said first portion to supply gas under pressure thereto, further conduits filled with inert gas supplied thereto, joining and filling with said inert gas, the second portion of said enclosure and one end chamber of the said housing, and still further conduits connected to the housing at the other end chamber thereof, and to a means for creating a vacuum in said chamber connected thereto, said indicia means being controlled to show no displacement of said diaphragm from a centered position between the first and seconds portions of their enclosure when the housing is tilted sufficiently to cause the axial component of the weight of the piston means to equal to that pressure in the inert gas which was received through the said diaphragm from the gas pressure in the container.

References Cited by the Examiner
UNITED STATES PATENTS

| | | | |
|---|---|---|---|
| 2,853,880 | 9/58 | Redding | 73—419 |
| 2,952,156 | 9/60 | Lee | 73—419 |
| 3,037,375 | 6/62 | Jacobs et al. | 73—53 |
| 3,056,282 | 10/62 | Boyd | 73—53 |

OTHER REFERENCES

Hutton: "A Tilting Air-Lubricated Piston Gage for Pressures Below One-Half Inch of Mercury," Journal of Research of the Nation Bureau of Standards, C. Engineering and Instrumentation, vol. 63c, No. 1, July-September 1959, pages 47–57.

LOUIS R. PRINCE, *Primary Examiner.*

RICHARD QUEISSER, *Examiner.*